United States Patent [19]

Beers

[11] 4,356,116

[45] Oct. 26, 1982

[54] DEVOLATILIZED ROOM TEMPERATURE VULCANIZABLE SILICONE RUBBER COMPOSITION

[75] Inventor: Melvin D. Beers, Schenectady, N.Y.

[73] Assignee: General Electric Company, Waterford, N.Y.

[21] Appl. No.: 250,800

[22] Filed: Apr. 3, 1981

[51] Int. Cl.³ .................. C08L 33/06; C08G 77/34
[52] U.S. Cl. .......................... 524/837; 277/DIG. 6;
 528/17; 528/18; 528/33; 528/34; 528/501;
 525/477; 524/731
[58] Field of Search ............... 528/501, 33, 17, 34;
 260/37 SB, 29.1 SB; 277/DIG. 6; 525/477

[56] References Cited

U.S. PATENT DOCUMENTS

| | | | |
|---|---|---|---|
| 3,382,205 | 5/1968 | Beers | 528/41 |
| 3,635,743 | 1/1972 | Smith | 106/288 Q |
| 3,813,364 | 5/1974 | De Zuba et al. | 260/37 SB |
| 4,153,501 | 5/1979 | Fink et al. | 159/49 |
| 4,250,290 | 2/1981 | Peterson | 528/14 |

Primary Examiner—Wilbert J. Briggs, Sr.
Attorney, Agent, or Firm—E. Philip Koltos

[57] ABSTRACT

A devolatilized room temperature vulcanizable silicone rubber composition comprising a silanol polymer, a plasticizing fluid, a cross-linking agent, a curing promoter and optionally, a filler wherein the plasticizing fluid and the silanol polymer are devolatilized prior to being mixed to form the room temperature vulcanizable silicone rubber composition by heating them at temperatures of at least 200° C. under vacuum for at least 5 minutes. If there is utilized a filler and the filler is treated with cyclopolysiloxanes or silazanes, then preferably the filler is also devolatilized.

47 Claims, No Drawings

DEVOLATILIZED ROOM TEMPERATURE VULCANIZABLE SILICONE RUBBER COMPOSITION

BACKGROUND OF THE INVENTION

The present invention relates to room temperature vulcanizable silicone rubber compositions and more particularly the present invention relates to devolatilized room temperature vulcanizable silicone rubber compositions.

Room temperature vulcanizable silicone rubber compositions have been known for some time. Such compositions generally comprise a silanol base polymer optionally a filler which may be a reinforcing silica filler such as percipitated silica or fumed silica or may be an extending filler. In the room temperature vulcanizable (hereinafter referred to as RTV) silicone rubber composition, there is also present a cross-linking agent and a curing promoter. Examples of cross-linking agents are for instance methyl triacetoxysilane, methyl tris (2-ethylhexanoyloxy) silane, methyl trisbenzoxy silane, functional amines, functional aminoxy compounds, functional amide compounds, functional ketoxine compounds, etc. With such compounds, there is preferably utilized as metal salt as a curing promoter. The most preferred metal salts are tin salts, such as for instance, dibutyltin dilaurate, dibutyltin dilaurate and dimethyltin bis-neodecanoate.

A slightly different RTV composition is obtained by utilizing as a cross-linking agent an alkoxy functional silane such as methyl trimethoxysilane and as a curing promoter a titanium ester, for instance, disclosed in Beers U.S. Pat. No. 4,100,129. All these compositions are what is known as one-component RTV compositions that is, they are packaged in a substantially anhydrous state in the absence of moisture and stored as such and when it is the desired to apply the composition, the seal on the package is broken and the composition is applied. Hydrolysis from atmospheric moisture causes the composition cure to a silicone elastomer with the final cure taking place within 24–72 or more hours.

It was desirable in many instances to incorporate such composition, a plasticizing fluids, such as that for instance, as disclosed in Beers U.S. Pat. No. 3,382,205 where there was incorporated per 100 parts of the base silanol polymer from 2–30 parts by weight of the plasticizing fluid which was composed of monoorgano siloxy units, diorganoorgano siloxy units and triorganosiloxy units where the organo group was a monovalent hydrocarbon radical and where a fluid contains from 0.1 to 2.0 percent by weight of hydroxyl groups. For more fuller disclosure as to such fluids one is referred to the foregoing U.S. Pat. No. 3,382,205 which is hereby incorporated by reference.

It was well known to incorporate the plasticizing fluid in the silanol polymer along with fumed silica, carbon black, cross-linking agent and a adhesion promoter and a tin salt to form one-component self-bonding RTV composition. It should be noted that that adhesion promoters such as dialkoxy diacyloxy silanes, were also known as disclosed in Kulpa U.S. Pat. No. 3,296,161. Also the use of aluminum stearate as well as the use of calcium and aluminum compounds as stabilizers for such compositions to improve the shelf stability is also known as disclosed in Beers Ser. No. 196,887 which is hereby incorporated by reference.

Such compositions are utilized for automotive applications by various methods. Thus there have been developed complicated, automated machines for applying such compositions as gasketing compositions for automotive oil pans. These same complicated automated machines can meter out a precise amount of RTV silicone compositions for forming gaskets for various other parts in automotive applications. It is desired to have such automated equipment for the production of gaskets for automotive applications since they can meter out the exact quantity of silicone needed and can precisely form the silicone layer for the formation of a good gasket in a rapid manner.

However, more simple machines have been developed for the application of such silicone gasketing material for the formation of gaskets for various components, automotive and nonautomotive. As for instance disclosed in Kruszona Ser. No. 78,754 which is hereby incorporated by reference.

Returning to the automotive applications, it was desirable to incorporate one-component RTV silicone compositions as gasketing compositions for automotive components for various reasons. Some of these reasons were the oil resistance of the silicones, their high temperature stability, their inertness to ozone and their resistance to ultra violet rays. Accordingly some cars have silicone gaskets for the oil pans and on the valve covers and even on the intake manifold. As the silicones and the properties of silicones are more fully appreciated, it can be seen that more and more parts or gaskets in a automobile will be made from silicone RTV compositions. However, it is noted that there was one problem with the use of such silicones.

Some modern or present day automobiles have oxygen sensors in the exhaust system which monitor the amount of oxygen in the exhaust fumes. This oxygen sensor which works on a electrical conduction principle transmits this information back to the computer which then determines the correct amount of intake of oxygen or air that is to be mixed with the fuel in the carburetor so that the carburetor utilizes or burns the fuel most efficiently. It was found that normal gasketing RTV compositions that were applied for such an automotive application, such as for instance, the intake manifold gaskets would give off volatiles to a slight degree in which even the slight degree of volatiles was sufficient to coat the oxygen sensor with silica. Then such detecting equipment would not work and cause a malfunction in the automobile as far as oxygen sensor detecting and transmitting of information to the computer and to the carburetor was concerned. This amount of volatiles that were given off from the silicone RTV gasketing compositions was traced to the small amount of volatiles that was present in the gasketing composition upon its being manufactured, applied and cured in place to a silicone elastomer i.e. gasket. These volatiles are basically low molecular weight linear polysiloxane polymers and cyclopolysiloxanes that have not reacted into the basic composition and when the cured silicone elastomer was heated at elevated temperatures, small amounts of volatiles are given off and burn in the combustion chamber thus leaving silica to foul up the oxygen sensor in the automobiles.

Accordingly it became necessary to remove most volatiles for such a composition, that is such that in the total composition there was silicone volatiles at a maximum of 0.003 grams per cubic centimether cured silicone elastomer as defined by TGA analysis. If this specification is met, then the gasketing composition will not foul up the oxygen censor. To accomplish this, it was necessary to devolatilize the basic polymer, the basic plasticizing fluid and the filler to a greater extent than was previously done. Low volatile or devolatilized two-component RTV compositions were known in the past but such compositions did not contain silicone treated fillers. Also low volatile one-component RTV compositions were known in the past but not compositions containing the devolatilized plasticizing fluids of the instant invention. In addition, the instant continuous method for devolatilizing the base silanol polymer and plasticizing fluid of the present invention was known in the past.

Accordingly, it is one object of the present invention to provide a devolatilized one-component RTV silicone composition.

It is an additional object of the present invention to provide for a devolatilized one-component RTV composition which will not foul up oxygen censors in automotive systems.

It is still an additional object of the present invention to provide a devolatilized one-component RTV composition in which all of the base silanol fluid, the plasticizing fluid and the silica filler are devolatilized, such that the silica resulting from the combustion of the silicone volatiles of the composition does not exceed 0.003 grams per cubic centimeter of cured composition as a maximum.

It is yet an additional object of the present invention to provide a novel, continuous process for devolatilizing the base silanol polymer and a plasticizing fluid that are utilized to form a devolatilized one-component RTV silicone gasketing composition. These and other objects of the present invention are accomplished by means of the disclosure set forth herein below.

SUMMARY OF THE INVENTION

In accordance with the above objects, there is provided by the present invention, a devolatilized room temperature vulcanizable silicone rubber composition comprising (A) 100 parts by weight of a devolatilized silanol-terminated linear diorganopolysiloxane base polymer having a viscosity varying from 100 to 1,000,000 centipoise at 25° C. where the organo group is a monovalent hydrocarbon radical and wherein the base polymer is devolatilized by heating it at temperatures of at least of 220° C. under vacuum for at least 2 minutes. From 2–30 parts by weight of a devolatilized plasticizing fluid having from 3 to 60 mole percent of monoorganosiloxy units of the formula,

$RSiO_{1.5}$ 34 to 96 mole percent of diorganosiloxy units of the formula,

$R_2SiO$ and 1 to 6 mole percent of triorganosiloxy units of the formula,

$R_3SiO_{0.5}$ which fluid contains from 0.1 to 2.0% by weight of hydroxyl groups and where R is a monovalent hydrocarbon radical wherein the plasticizing fluid is devolatilized by heating the fluid at a temperature of at least 260° C. under vacuum for at least 5 minutes; from 0.1 to 15 parts by weight of a cross-linking agent; from 0.01 to 10 parts by weight of a catalytic promoter.

It should be noted that the base silanol polymer and the plasticizing fluid are devolatilized by heating them at a temperature in the range of 220°–290° C. for 5 minutes to 60 minutes under a vacuum of anywhere from 1 to 50 millimeters of mercury. Preferably the devolatilization is carried out under a nitrogen purge so as to remove the volatiles and prevent oxidation. Preferably such devolatilization is carried out in a continuous manner and will be disclosed below.

Also there may be present in the composition from 5 to 100 parts by weight of a devolatilized treated silica filler which was devolatilized by heating the filler to at least 250° C. under vacuum for at least 20 minutes.

The invention will be more fully disclosed hereinbelow.

DESCRIPTION OF THE PREFERRED EMBODIMENT

The basic ingredient in the devolatilized room temperature vulcanizable silicone rubber composition of the present invention comprises 100 parts by weight of a devolatilized linear diorganopolysiloxane polymer having a viscosity varying from 100 to 1,000,000 centipoise at 25° C. where the organo groups are monovalent hydrocarbon radicals. Preferably, the polymer can have up to 10 weight percent of trifunctional groups in it but is basically a linear polymer. Preferably most of the linear diorganopolysiloxane polymer is a linear polymer which has the formula,

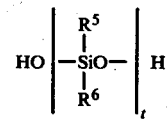

where $R^5$ and $R^6$ are independently selected from monovalent hydrocarbon radicals and t varies such that the polymer has a viscosity varying from 100 to 1,000,000 centipoise at 25° C. More preferably the polymer has a viscosity varying from 100 to 200,000 centipoise at 25° C.

The radicals of $R^5$ and $R^6$ can be the same or different and are independently selected from any monovalent hydrocarbon radicals. This includes halogenated monovalent hydrocarbon radicals such as fluoroalkyl.

Accordingly the radicals $R^5$ and $R^6$ can be alkyl radicals such as methyl, ethyl, propyl, cyclo alkyl radicals such as cyclohexyl, cycloheptyl etc; radicals such as vinyl, allyl etc.; mononuclear aryl radicals such as phenyl, methylphenyl, ethylphenyl etc. and fluoroalkyl radicals such as 3,3,3-trifluoropropyl. Most preferably $R^5$ and $R^6$ are selected from alkyl radicals of 1 to 8 carbon atoms and alkenyl radicals of 2 to 8 carbon atoms, most preferably being selected from methyl and vinyl.

Such polymer are preferably produced by the continuous polymerization process of Petersen as disclosed in U.S. Pat. No. 4,250,290 which is hereby incorporated by reference. This polymerization reaction comprise taking cyclopolysiloxanes, water as the chain-stopper and a catalyst and continuously polymerizing the mixture disclosed in the foregoing Petersen U.S. Pat. No. 4,250,290.

The process also comprises equilibrating the polymer so that about 85-86% of the cyclopolysiloxanes are formed into linear silanol end-stopped polymer and devolatilizing to remove most of the cyclic polysiloxanes. As disclosed in that patent, the volatile separator is maintained at an absolute pressure of approximately 5 to 10 millimeters, Hg. The patent does not appear to disclose a temperature at which the volatile separator was operated but previously such a separator was operated at a temperature of anywhere from 160°-190° C. However, it was found that sufficient devolatilization of the volatiles was not accomplished, that is the volatiles were not sufficiently removed by such a separator to the extent desired in the present invention by operating the separator at that temperature range. Accordingly, this process of Petersen was modified so as to increase the temperature of the separator to a temperature of at least 220° C. so that the polymer passing therethrough was heated to a temperature of at least 220° C. at 1 to 50 millimeters of vaccum under a inert gas atmosphere for at least 2 minutes.

In such a process it was possible to devolatilize the basic silanol diorganopolysiloxane polymer continuously so that there was formed a devolatilized silanol terminated diorganopolysiloxane polymer having a volatile content that does not exceed 0.003 grams of silica per cubic centimeter of polymer. The volatile vapor can be removed in the separator which preferably can be any efficient stripper and is preferably a plate and frame stripper wherein the devolatilized polymer is removed from the bottom of the vapor liquid separator and the cyclic vapors are removed from the top of the separator. Another name for the liquid vapor entrainment separator, is a plate and frame stripper which is preferably utilized. Any type of stripper can be utilized which passes the polymer continuously in a thin film and allows it to be passed through the equipment so as to remove the volatiles rapidly and under a $N_2$ atmosphere.

Preferably the separation is carried out of the pressure of 1 to 50 millimeters of vacuum. More preferably the separation is carried out under vacuum of 1 to 10 millimeters of mercury for 5 to 10 minutes. Preferably the inert gas atmosphere is a nitrogen gas atmosphere. Accordingly, the polymer should be heated in the plate and frame stripper or in the separator as it may be called at a temperature of at least 230° C. and more preferably, from 230°-260° C. and more preferably from 235°-250° C. for a time of 5 to 15 minutes. At such temperatures, the necessary separation of volatiles can be carried out such that there is very little volatiles left in the polymer or such that with the total volatiles left in the polymer it meets the requirements of the foregoing volatile content that was specified previously. it should be noted that this separation of volatiles from the silanol base polymer can be carried out continuously or batch wise depending on how the polymer is produced and depending on the way the processes are to be carried out.

Accordingly, by carrying out the process of the present invention at the higher temperature for operating the separator or plate and frame strippr the silanol base polymer can be continuously devolatilized to the necessary degree.

Along with the base polymer there is per 100 parts of the base polymer from 2 to 30 parts by weight of the devolatilized plasticizing fluid having (i) from 3 to 60 mole percent of monoorganosiloxy units or monoalkylsiloxy units or a mixture of such units; (ii) from 1 to 6 mole percent of triorganosiloxy units or trialkylsiloxy units; and (iii) from 34 to 96 mole percent of diorganosiloxy units or dialkylsiloxy units, said polysiloxane containing from about 0.1 to about 2.0 percent by weight of silanol groups where the organo group is a monovalent hydrocarbon radical as disclosed for $R^5$, $R^6$ radicals defined previously. For more information as to the preparation of such plasticizing fluids one is referred to the disclosure of Beers U.S. Pat. No. 3,382,205 which is hereby incorporated by reference. However, proceeding to the method of separating the volatiles from such plasticizing fluids again the process comprises taking the fluid and passing the fluid through a stripper which heats the fluid to a temperature of at least 260° C. for a period of time of at least 5 minutes under inert gas atmosphere of 1 to 50 millimeters of Hg vacuum. Preferaly, the devolatilizer stripper is Rodney-Hunt devolatilizer. It is a vertical cylinder and the fluid passes down the inside surfaces of the vertical cylinder with wiper blades agitating the thin film of the fluid on the inside surface wherein the inside of the cylinder is preferably heated at a temperature of anywhere from 260°-300° C. and most preferably heated at a temperature of anywhere from 280°-290° C.

The vacuum can be anywhere from 1 to 50 millimeters but is more preferably at a vacuum of 1 to 10 millimeters of mercury for 15 minutes to four hours. Preferably there is utilized an inert gas atmosphere to prevent the fluid from oxidizing at the high temperatures and more preferably the inert gas is nitrogen. The devolatilization of the plasticizing fluid can be done continuously or it can be done batch wise. The plasticizing fluid is prepared in accordance with the process of the foregoing patent. The fluid then can be continuously passed through a Rodney-Hunt Devolatilizer and continuously devolalitized in accordance with the procedures and methods disclosed above. It can be passed continuously through a Rodney-Hunt devolatilizer to strip off the volatiles such that the fluid remaining does not have a volatile content that exceeds 0.003 grams of silica per cc. of polymer. On the other hand, the fluid can be prepared batchwise in accordance with the presence of the foregoing patent then subjected to a stripping procedure disclosed in the instant patent application. It should be noted that prior to the present time, such plasticizing fluid, such as that disclosed above, while subjected to a devolatilizing procedure was never subjected to the stripping procedure of the present invention.

In place of the trifunctional plasticizing fluid as disclosed above, there may be utilized a plasticizing fluid which is triorganosiloxy end-stopped linear diorganopolysiloxane polymer of a viscosity varying from 10 to 20,000 centipoise at 25° C. where the organo groups are selected from the same organo groups as disclosed previously for the $R^5$ and $R^6$ radicals and wherein the radicals are most preferably methyl.

It should be noted that the trifunctional plasticizing fluid also preferably has a viscosity varying from 10 to 20,000 centipoise at 25° C. and more preferably, a viscosity varying from 10-10,000 centipoise at 25° C.

The triorganosiloxy end-stopped linear diorganopolysiloxane polymer is produced by hydrolyzing in water trimethylchlorosilane along with a small amount of dimethyldichlorosilane. Then equilibrating the hydrolyzate with cyclotetrasiloxanes and utilizing the hydrolyzate as a chain-stopper to produce at elevated temperatures a linear triorganosiloxy end-stopped diorganopolysiloxane polymer of a having a viscosity in the range indicated previously where the organo group is preferably methyl. However, the catalyst utilized in the reaction is preferably acid treated clay and specifically sulfuric acid treated clay, which equilibrates the reactants to the linear polymer. This is an equilibration reaction so that when 85-86% of the cyclics have been formed to a linear polymer, no more of the cyclics can be converted to the linear polymer. At that point the catalyst is removed by filtration and the volatiles may then be stripped off. The volatiles may be stripped off by heating the polymer in a stripper at a temperature of about 200° C. for the desired amount of time. No patentability is maintained for the stripping or devolatilization of the trimethylsiloxy end-stopped dimethylpolysiloxane polymer.

However, the the modified process for producing the devolatilized silanol end-stopped base polymer and also the trifunctional plasticizing fluid was not known prior to the present application. The trifunctional plasticizing fluid preferably utilized in one-component RTV compositions since it improves the adhesion of the composition and the other physical properties over the utilization of the trimethylsiloxy end-stopped dimethyl polysiloxane polymer. The trimethylsiloxy end-stopped dimethyl polysiloxane polymer is preferred as a plasticizing fluid with certain compositions where physical properties are not as important.

Along with these two ingredients, per 100 parts of the base polymer, there may be utilized from 5-100 parts by weight of a treated silica filler. If the filler is not treated with a silicone such as cyclics and low molecular weight silazanes so as to adhere organosiloxy groups to the silica as a result of treatment then it is not necessary to devolatilize it. However, if the filler which is preferably silica filler is treated with cyclopolysiloxanes and with silazanes then they must be devolatilized.

Examples of disclosures in the treatment of fillers and specifically reinforcing fillers which is selected from the class consisting of fumed silica and percipitated silica as for instance Lucas U.S. Pat. No. 2,938,009, Lichtenwalner U.S. Pat. No. 3,004,859 and Smith U.S. Pat. No. 3,635,743.

The filler is preferably heated at a temperature of at least 250° C. and more preferably at a temperature of 275°-325° C. under nitrogen for at least 20 minutes and more preferably from a period of time varying from 20 minutes to 4 hours. Devolatilization of the silica filler is carried out with the aid of a nitrogen purge to remove organosiloxy groups that are not firmly appended to the filler as well as low molecular weight cyclics and linear diorganopolysiloxane polymers that are not appended to the silica particles of the filler. The filler after being devolatilized must have volatile content that does not exceed 0.003 grams of silica upon combustion per cubic centimeter.

It should be noted that there can be utilized in the composition from 5-200 parts by weight of extending fillers. But such extending fillers, it meant such as that for instance disclosed in Beers Ser. No. 70,435 and are usually incorporated without treatment into the composition. However if such fillers are treated with silicones and more particularly with cyclopolysiloxanes or silazanes, then they need to be devolatilized the same as the silica filler.

Accordingly, in accordance with the present invention, the basic ingredients that have to be devolatilized in the instant invention are the silanol polymer, the plasticizing fluid and the silica filler. The other ingredients may be utilized in the composition as they were previously disclosed without having any effect on the volatility of the composition, particularly of the cured composition. The other ingredients in the compositions are the traditional ingredients such as for instance from 0.1 to 15 parts by weight of a cross-linking agent. It should be noted that preferably the devolatilization of the silica filler is at a temperature of 250°-325° is preferably carried out under an inert gas atmosphere such as nitrogen gas to prevent the filler from oxidizing at the high temperatures. The filler is preferably devolatilized for a period of time varying from 1½ hours to 4 hours under the foregoing conditions. The cross-linking agent is preferably in acyloxy cross-linking agent that has the formula,

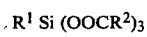

where $R^1$ and $R^2$ are monovalent hydrocarbon radicals. Most preferably, the cross linking agent as disclosed in the above formula is methylacetoxy silane or methyltris (2-ethylhexanoxy) silane.

Per 100 parts of the base polymer there is utilized from 0.1 to 15 parts by weight of a cross linking agent and from 0.1 to 10 parts of a catalytic promoter. When the cross-linking agent is an acyloxy functional silane, then it is desirable that the catalytic promoter be a tin salt. Examples of perferable catalytic promoters is a metal salt of a carboxylic acid and most preferably a tin salt. It should be noted that the tin salt need not be a salt of a carboxylic acid, it can be a tin salt such as dibutyl tin oxide, or it can be a tin salt of carboxylic acid such as dibutyl tin dilaurate or dimethyl tin bis-neodecanoate. As a matter of fact, if there is any type of tin salt, preferably salts such as dibutyltinoxide and dibutyltin dilaurate, may be utilized as catalysts for one-component RTV compositions within the scope of the instant invention with a whole variety of cross-linking agents.

Other cross-linking agents which may be utilized is amine functional cross-linking agents such as for instance disclosed in Nitzsche et al. U.S. Pat. No. 3,032,528 and amide functional cross-linking agents such as for instance disclosed in Sattlegger et al. U.S. Pat. No. 3,378,520, aminoxy RTV cross-linking agents such as for instance disclosed in the patents of Murphy U.S. Pat. No. 3,296,199, U.S. Pat. No. 3,341,486, U.S. Pat. No. 3,379,659, U.S. Pat. No. 3,441,583 and U.S. Pat. No. 3,484,471. In addition to the aminoxy cross-linking agents, there may be amide complexes such as disclosed in Toporcer U.S. Pat. No. 3,817,909. Other systems are ketoxime cross-linking agent as for instance in Beers et al. U.S. Pat. No. 3,962,160 and alkenyloxy functional cross-linking agents as for instance disclosed in Takago et al. U.S. Pat. No. 3,819,563 and Takago U.S. Pat. No. 3,180,642 all of which patents are hereby incorporated by reference.

The present invention can be utilized to devolatilize the base polymer either batch-wise or continuously or a trifunctional plasticizing fluid batch-wise continuously. In accordance with instance disclosure with the cross-linking agent of any functionality the filler is also devolatilized but that is done by a batch wise process as disclosed above. It should be noted that the composition can also incorporate from 0.1 to 5 parts by weight of an adhesion promoter which is preferably can be a dialkoxy dimethylsilane as for instance disclosed in Kulpa U.S. Pat. No. 3,296,161 which is hereby incorporated by reference. The Kulpa patent is important to disclose also an acetoxy functional cross-linking system as was described previously. Preferably the adhesion promoter is ditetiarybutoxydiacetoxy silane. The adhesion promoter to which is present at a concentration of 0.1 to 5 parts by weight per 100 parts of the base polymer can also be selected from silyl maleates, silyl fumerates and silyl phthalates as disclosed in Smith et al. Ser. No. 16,254 which is hereby incorporated by reference. Another adhesion promoter that can be utilized is the silyl isocyanurates disclosed in U.S. Pat. No. 3,517,001 which is hereby incorporated by reference.

The above cross-linking agents best react or are most compatible with a tin salt curing promoter. There also may be utilized an alkoxy functional cross-linking agent of the formula,

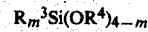

$$R_m^3 Si(OR^4)_{4-m}$$

where $R^3$ and $R^4$ are monovalent hydrocarbon radicals and m is 0 is 1. Most preferably $R^3$ and $R^4$ are alkyl radicals of 1-8 carbon atoms, such as methyl. It is most preferred that alkoxy functional cross-linking agent be a methyl trimethoxy silane.

It should be noted in the foregoing formula for the acyloxy functional silane, $R^2$ is preferably an alkyl radical of 1-15 carbon atoms and is preferably $R^1$ is preferably an alkyl radical from 1-8 carbon atoms.

Proceeding to the alkoxy functional cross-linking agent, there is preferably utilized with such cross-linking agents a titanium ester as disclosed for instance in Beers U.S. Pat. No. 4,100,129 which is hereby incorporated by reference. It is not intended here to go into detail here in the process and compositions of different types of one-component RTV compositions, it being noted that there can be utilized with the instant invention various types of one-component RTV compositions which are functionalized by different cross-linking agents in which the curing promoter is of different types. What is intended to be the object of the present disclosure is the devolatilized one-component RTV systems in accordance with the present invention. Accordingly, the base composition which is disclosed within the present invention is a composition in which the base silanol polymer and the plasticizing fluid which is trifunctional are devolatilized with the method shown above here alone or a combination with the silica filler. A devolatilized composition with a base silanol polymer with other types of plasticizing fluid or with the filler alone are not within the scope of the instant invention. In most if not all RTV compositions, what has to be devolatilized to produce a properly devolatilized composition within the above definitions is one in which the silanol base polymer, the plasticizing fluid and the silica filler that has been devolatilized to the extent shown above. The other ingredients do not have to be devolatilized since they cure or cross link into the system and do not have any volatiles remaining. Accordingly, these three ingredients are properly devolatilized and there results a one-component RTV composition with a volatile content that does not exceed 0.003 grams of silica per cubic centimeter which is the required measurement. In addition within instant invention, is a process for devolatilizing the silanol base polymer continuously or batch wise in accordance with the instant invention and a process for devolatilizing a trifunctional plasticizing fluid, either batch wise or continuously in accordance with the instant disclosure and the incorporation of such devolatilized ingredients in a one-component RTV composition, either with or without a devolatilized silica filler.

Accordingly proceeding to the Examples, the Examples below are given for the purpose of illustrating the present invention and they are not given for any purpose of setting limits and boundaries to the instant invention. All parts are by weight.

EXAMPLE 1

There was prepared a RTV composition comprising 100 parts by weight of a silanol terminated dimethylpolysiloxane polymer of 6,000 centipoise viscosity at 25° C., 10 parts by weight of a trifunctional fluid compose of 3 mole percent of trimethylsiloxy monofunctional units, 20 mole percent of monomethylsiloxy trifunctional units, 77 mole percent of dimethyl difunctional siloxy units and 0.5 weight percent of silanol. After this there was added 20 parts by weight of cyclotetrasiloxane treated fumed silica, 0.1 parts of aluminum stearate, 0.05 parts of carbon black pigment, 4.18 parts of methyl triacetoxysilane, 1.04 parts of di-tertiary-butoxydiacetoxysilane silane and 0.033 parts of dibutyltin dilaurate.

The base silanol polymer is devolatilized in a batch process comprising taking 5,000 parts of the polymer in a 10 liter, three-necked flask equipped with a mechanical stirrer, thermometer, nitrogen purge dip tube and vacuum outlet. The devolatilization was completed after 5 hours at 160° C. under vacuum of 80-150 millimeter of mercury pressure accompanied by a vigorous nitrogen purge. The TGA (Thermogravimetric Analysis) the TGA weight loss weight loss was of 1.3 percent initial and 0.01 final. The trifunctional polysiloxane fluid was devolatilized in the same way as the base polymer and the initial TGA was 0.3 weight percent and the final TGA was 0.01 weight percent.

The cyclotetrasiloxane treated fumed silica was placed in one gallon glass jar and then covered with perforated aluminum to allow the escape of silicone volatiles. It was then heated to 250° F. in a hot air circulating oven for 24 hours. The initial weight loss before heating was 5.5 weight percent; the final weight loss was 0.4 weight percent.

The above composition when cured had a Specific Gravity of 1.07; it gave a calculated silica level from combustible silicone volaties of 0.0006 grams per cc. which was well below the 0.003 grams per cubic centimeter allowed maximum. The TGA weight loss were determined using a programmed temperature increase of 80° C. per minute to 121° C. (250° F.) and then holding the sample at 121° C. for 1 hour. The total amount of silica available from the silica volatiles is then calculated from the following equation:

Total silica available from silicone volatiles (grams/cc) = Weight fraction loss × 0.81 (SiO₂ conversion factor) × density The above composition also yields the following physical properties,

| Tack free time, minutes | 13 |
|---|---|
| Flow, inches | 0.1 |
| Application Rate g./minutes(1) | 480 |
| Specific Gravity | 1.07 |

-continued

| | |
|---|---|
| Shear Adhesion, psi | 172 |
| Shore A hardness | 40 |
| Tensile, psi | 435 |
| Elongation, % | 340 |

(1)The application rate was determined for forcing the sealant through a ⅛ inch diameter orifice under an air pressure of 90 psi.

EXAMPLE 2

An identical composition is prepared as described in Example 1. However, the polymer, plasticizer and filler are devolatilized continuously as described below. Essentially the same results are obtained as described in Example 1. Two polymers are prepared of (3,000 cps. and 20,000 cps. viscosity). The 3,000 cps. of polymer is made by a continuous polymerization process in which dimethyl cyclic siloxane monomers, potassium silanolate catalyst, (equivalent to 15 ppm KOH), and 100–500 ppm water are preheated and introduced into a static mixer at a temperature in the range of 170° to 200° C. at such rate that the residence time in the static mixer will be adequate to obtain the desired degree of polymerization (for example: 24 minutes residence time at 180° C. polymerization temperature). Additional water is added to the polymerizer at a point two-thirds the length of the static mixer. The total water introduced into the polymerization is controlled at approximately 1,000 ppm to the monomer feed rate so as to control the viscosity of the finished polymer at 3,000 cps. The polymerizer is maintained at a process sufficient to prevent vaporization of water at the polymerization temperature—typically 170 psig minimum. The silyl phosphate neutralizing agent (equivalent to 25 ppm. phosphoric acid) is then mixed with the polymer in a two-stage mechanical mixer and the mixture passed into a second static mixture providing approximately five minutes minimum residence time for completion of the neutralization of the potassium silanolate by the silyl phosphate. The neutralized polymer is the preheated and flashed into a vacuum chamber maintained at approximately 10 mm absolute porcessor and a polymer temperature of 220° C. The devolatilized polymer is then pumped out of the vacuum chamber, cooled, and stored. The 20,000 cps. polymer is made in a similar manner except that total water content was 440 ppm to obtain the higher viscosity. The resulting polymers are then blended to 6,000 at 600 cps.

The plasticer described in Example 1 is devolatilized continuously by the following process. It is first pumped into a preheater (150° C.) where the first portion of the volatiles are vaporized. After the pre-heater, a steam strip is introduced to further acid in the devolatilization process. The vapor and liquid then enter a flash tank where the vapor is separated via an exit condenser. The liquid then is transferred to a thin film jacketed evaporator (Rodney-Hunt) where the last portion of volatiles are removed again with the aid of steam stripping at a temperature of 250° C. and vacuum of 5 mm Hg. The product is then transferred to storage tanks under a dry nitrogen blanket.

The treated filler referred in Example 1 is semi-continuously prepared by pumping pre-heated (270° C.) fumed silica having a surface area of approximately 200 m²/gram into a 275° C. glass-lined kettle containing an agitator and inerted with a nitrogen atmosphere, 18 parts of octa methyl tetracyclosiloxane per 100 parts of filler are then pumped into the kettle. The contents are then cooled at temperatures of 275° to 290° C. for 25 minutes. After this, the batch is devolatilized using a nitrogen purge for three hours. The weight loss requirements as set forth in Example 1 are then met.

I claim:

1. A devolatilized room temperature vulcanizable silicone rubber composition wherein the volatiles content does not exceed 0.003 gm/c.c. of silica comprising (A) 100 parts by weight of devolatilized diorganosilanol chainstopped linear diorganopolysiloxane base polymer having a viscosity varying from 100 to 1,000,000 centipoise at 25° C. where the organo group is a monovalent hydrocarbon radical and wherein the base polymer is devolatilized by heating at temperatures above 220° C. under vacuum for at least 2 minutes; (B) from 3 to 30 parts by weight of a devolatilized plasticizing fluid having from 3 to 60 mole percent of monoorganosiloxy units of the formula,

$RSiO_{1.5}$ 34 to 96 mole percent of diorganosiloxy units of the formula,

$R_2SiO$ and 1 to 6 mole percent of triorganosiloxy units of the formula,

$R_3SiO_{0.5}$ which fluid contains from 0.1 to 2.0% by weight of hydroxyl group and where R is a monovalent hydrocarbon radical wherein the plasticizing fluid is devolatilized by heating the fluid at a temperature of at least 260° C. under vacuum for at least 5 minutes; (C) from 0.1 to 15 parts by weight of a cross-linking agent; and (D) from 0.01 to 10 parts by weight of a catalytic promoter.

2. The devolatilized composition of claim 1 wherein Component (A) is devolatilized by heating it at a temperature in the range of 230°–260° C. for 5 to 60 minutes and Component (B) is devolatilized by heating it to a temperature in the range of 260°–300° C. for a period of time varying from 15 to 60 minutes.

3. The devolatilized composition of claim 2 wherein Components (A) and (B) are devolatilized by heating them under a vacuum of 1 to 50 millimeters of Hg.

4. The devolatilized composition of claim 3 wherein Components (A) and (B) are devolatilized by heating them under a N₂ purge atmosphere.

5. The devolatilized composition of claim 4 wherein there is further present from 5 to 100 parts by weight of devolatilized treated silica filler which is devolatilized by heating the filler at least 250° C. under a nitrogen purge for at least 20 minutes.

6. The devolatilized composition of claim 5 wherein the silica filler is treated with compounds selected from the class consisting of cyclopolysiloxanes, silazanes and mixtures thereof.

7. The devolatilized composition of claim 6 wherein the silica filler is heated for 10 minutes to 4 hours at a temperature in the range of 275°–400° C.

8. The devolatilized composition of claim 7 wherein the silica filler is heated under a N₂ purge.

9. The devolatilized composition of claim 8 wherein the cross-linking agent has the formula,

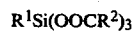

$R^1Si(OOCR^2)_3$ where $R^1$ and $R^2$ are monovalent hydrocarbon radicals.

10. The devolatilized composition of claim 9 wherein the cross-linking agent is methyltriacetoxysilane.

11. The devolatilized composition of claim 10 wherein the catalytic promoter is a tin salt.

12. The devolatilized composition of claim 11 wherein the tin salt is dibutyl tin dilaurate.

13. The devolatilized composition of claim 9 wherein the cross-linking agent is methyl tris (2-ethylhexanoxy) silane.

14. The devolatilized composition of claim 12 wherein there is present from 0.1 to 5 parts by weight of an adhesion promoter which is a dialkoxydiacyloxy silane.

15. The devolatilized composition of claim 14 wherein the adhesion promoter is di-tetiarybutoxy diacetoxysilane.

16. The devolatilized composition of claim 15 wherein there is present a pigment.

17. The devolatilized composition of claim 16 wherein there is present from 0.01 to 5 parts by weight of aluminum stearate.

18. The devolatilized composition of claim 8 wherein the cross-linking agent has the formula, $$R_m{}^3Si(OR^4)_{4-m}$$

where $R^3$ and $R^4$ are monovalent hydrocarbon radicals and m is 0 or 1.

19. The devolatilized composition of claim 18 wherein the curing promoter is a titanium ester.

20. The devolatilized composition of claim 4 wherein said devolatilization is carried out continuously.

21. A process for forming a devolatilized room temperature vulcanizable silicone rubber composition comprising (1) mixing (A) 100 parts by weight of a devolatilized diorganosilanol chainstopped linear diorganopolysiloxane base polymer having a viscosity varying from 100 to 1,000,000 centipoise at 25° C. where the organo groups are monovalent hydrocarbon radicals wherein the base polymer is devolatilized by heating at temperatures above 220° C. and under vacuum for at least 2 minutes; (B) from 2 to 30 parts by weight of a devolatilized plasticizing fluid having from 3 to 60 mole percent of monoorganosiloxy units of the formula, $$RSiO_{1.5}$$

with 37 to 96 mole percent of diorganosiloxy units of the formula, $$R_2SiO$$

and 1 to 6 mole percent of triorganosiloxy units of the formula, $$R_3SiO_{0.5}$$

which fluid contains from 0.1 to 2.0% by weight of hydroxyl groups and where R is a monovalent hydrocarbon radical where the plasticizing fluid is devolatilized by heating the fluid at a temperature of at least 260° C. under vacuum for at least 5 minutes; (C) from 0.1 to 15 parts by weight of a cross-linking agent; and (D) from 0.01 to 10 parts by weight of a catalytic promoter and (2) allowing the composition to cure at room temperature.

22. The process of claim 21 wherein the cured silicone elastomer has a volatile content that does not exceed 0.003 grams of silica per cubic centimeter.

23. The devolatilized composition of claim 21 wherein Component (A) is devolatilized by heating it at a temperature in the range of 230°–260° C. for 5 to 60 minutes and Component (B) is devolatilized by heating it to a temperature in the range of 260°–300° C. for a period of time varying from 15 to 60 minutes.

24. The process for forming the devolatilized composition of claim 23 where Component (A) and Component (B) are devolatilized by heating them under vacuum of 1 to 10 millimeters of mercury.

25. The process of forming the devolatilized composition of claim 24 wherein Component (A) and Component (B) are devolatilized by heating them under a nitrogen purge atmosphere.

26. The process of claim 25 wherein there is further present from 5 to 100 parts by weight of devolatilized treated silica filler which is devolatilized by heating the filler at a temperature of at least 250° C. under a nitrogen purge for at least 20 minutes.

27. The process of claim 26 wherein the silica filler is treated with compounds selected from the class consisting of cyclopolysiloxanes, silazanes and mixtures thereof.

28. The process of claim 27 wherein the silica filler is heated for a period of time varying from 20 minutes to 4 hours in a temperature in the range of 250°–325° C.

29. The process of claim 28 wherein the silica filler is heated under vacuum of 1 to 10 millimeters of mercury under a nitrogen purge.

30. The process of claim 29 wherein the cross-linking agent has the formula, $$R^1Si(OOCR^2)_3$$

where $R^1$ and $R^2$ are monovalent hydrocarbon radicals.

31. The process of claim 30 wherein the cross-linking agent is a methyl triacetoxy silane.

32. The process of claim 31 wherein the catalytic promoter is a tin salt.

33. The process of claim 32 wherein the tin salt is dimethyl tin bis-neodecanoate.

34. The process of claim 33 wherein the tin salt is dibutyltin dilaurate.

35. The process of claim 30 wherein the cross-linking agent is methyl tris (2-ethylhexanoxy) silane.

36. The process of claim 33 wherein there is present from 0.1 to 5 parts by weight of a adhesion promoter which is a dialkoxydiacetoxy silane.

37. The process of claim 36 wherein the adhesion promoter is di-tertiary-butoxy diacetoxy silane.

38. The process of claim 36 wherein there is present a pigment.

39. The process of claim 37 wherein there is present from 0.01 to 5 parts by weight of aluminum stearate.

40. The process of claim 29 wherein the cross-linking agent has the formula, $$R_m{}^3Si(OR^4)_{4-m}$$

where $R^3$ and $R^4$ are monovalent hydrocarbon radicals and m is 0 or 1.

41. The process of claim 40 wherein the curing promoter is a titanium ester.

42. The process of claim 25 wherein such devolatilization is carried out continuously.

43. An automotive part having therein a devolatilized room temperature vulcanizable rubber gasket such that the silicone rubber has a volatile content that does not exceed 0.003 grams of silica per cubic centimeter of elastomer comprising (1) a substrate part constructed of a material selected from plastics and metals and (2) a devolatilized room temperature vulcanizable silicone rubber gasketing composition therein haing (A) 100 parts by weight of a devolatilized diorganosilanol chainstopped linear diorganopolysiloxane base polymer having a viscosity varying from 100 to 1,000,000 centipoise at 25° C. where the organo group is monovalent hydrocarbon radical and wherein the base polymer is devolatilized by heating it at temperatures above 220° C. under vacuum for at least 2 minutes; (B) from 2 to 30 parts by weight of a devolatilized plasticizing fluid having from 3 to 60 mole percent of monoorganosiloxy units of the formula, $$RSiO_{1.5}$$

with 34 to 96 mole percent of diorganosiloxy units of the formula, $$R_2SiO$$

and 1 to 6 mole percent of triorganosiloxy units of the formula, $$R_3SiO_{0.5}$$

which fluid contains from 0.1 to 2.0% by weight of hydroxyl group and where R is a monovalent hydrocarbon radical wherein the plasticizing fluid is devolatilized by heating the fluid at a temperature of at least 260° C. under vacuum for at least 5 minutes; (C) from 0.1 to 15 parts by weight of a cross-linking agent; and (D) from 0.01 to 10 parts by weight of a catalytic promoter.

44. The automotive structure of claim 43 wherein the substrate part is a automotive part selected from the class consisting of intake manifolds, engine valves, and oil pans.

45. The composition of claim 13 wherein the catalytic promoter is dimethyl tin bis-neodecanoate.

46. The composition of claim 13 wherein there is present from 0.01 to 5 parts by weight of an adhesion promter selected from the class consisting of silyl maleates, silyl fumerates, silyl phthalates and mixtures thereof.

47. The process of claim 35 wherein there is present from 0.01 to 5 parts by weight of an adhesion promoter selected from silyl maleates, silyl fumerates, silyl phthalates and mixtures thereof.

* * * * *